US010356376B2

United States Patent
Usui et al.

(10) Patent No.: US 10,356,376 B2
(45) Date of Patent: Jul. 16, 2019

(54) VEHICLE-MOUNTED CAMERA SYSTEM

(71) Applicant: CLARION CO., LTD., Saitama (JP)

(72) Inventors: Tsutomu Usui, Saitama (JP); Norihiko Nakano, Saitama (JP); Takahide Kojima, Saitama (JP)

(73) Assignee: CLARION CO., LTD., Saitama (JP)

(*) Notice: Subject to any disclaimer, the term of this patent is extended or adjusted under 35 U.S.C. 154(b) by 200 days.

(21) Appl. No.: 15/525,406

(22) PCT Filed: Sep. 24, 2015

(86) PCT No.: PCT/JP2015/076861
§ 371 (c)(1),
(2) Date: May 9, 2017

(87) PCT Pub. No.: WO2016/076016
PCT Pub. Date: May 19, 2016

(65) Prior Publication Data
US 2017/0339385 A1 Nov. 23, 2017

(30) Foreign Application Priority Data

Nov. 13, 2014 (JP) ................................. 2014-230608

(51) Int. Cl.
*H04N 9/73* (2006.01)
*H04N 5/235* (2006.01)
(Continued)

(52) U.S. Cl.
CPC ............. *H04N 9/735* (2013.01); *G03B 7/093* (2013.01); *G03B 15/00* (2013.01); *H04N 5/2351* (2013.01);
(Continued)

(58) Field of Classification Search
None
See application file for complete search history.

(56) References Cited

U.S. PATENT DOCUMENTS 5,170,069 A * 12/1992 Sakai .................. H02J 1/10
307/29
5,631,699 A * 5/1997 Saito .................... H04N 5/2251
348/143
(Continued)

FOREIGN PATENT DOCUMENTS

JP 2003-189315 7/2003
JP 2010-35120 2/2010
(Continued)

OTHER PUBLICATIONS

International Search Report dated Nov. 17, 2015 in International (PCT) Application No. PCT/JP2015/076861.
(Continued)

Primary Examiner — Mohammad J Rahman
(74) Attorney, Agent, or Firm — Wenderoth, Lind & Ponack, L.L.P.

(57) ABSTRACT

In a vehicle-mounted camera system, an appropriate white balance correction processing according to a situation is executed to a long exposure time image and a short exposure time image shot in variously changing illumination environments. A vehicle-mounted camera system includes a vehicle-mounted camera that performs relatively long exposure time shooting and short exposure time shooting, a signal processing device (signal processing device) that executes a white balance correction processing for each of a long exposure time image and a short exposure time image, composes these images after the white balance correction processing, and generates a high dynamic range image, and a system control part (processing switch device) that obtains an illumination environment in which the vehicle is placed, and switches the white balance correction processing for the long exposure time image and the white balance correction
(Continued)

processing for the short exposure time image according to the illumination environment.

4 Claims, 2 Drawing Sheets

(51) Int. Cl.
| | | |
|---|---|---|
| H04N 9/077 | (2006.01) | |
| G01C 21/26 | (2006.01) | |
| G03B 7/093 | (2006.01) | |
| G03B 15/00 | (2006.01) | |
| H04N 9/04 | (2006.01) | |
| H04N 5/355 | (2011.01) | |

(52) U.S. Cl.
CPC ....... *H04N 5/2355* (2013.01); *H04N 5/35554* (2013.01); *H04N 9/04* (2013.01); *H04N 9/077* (2013.01); *H04N 9/73* (2013.01); *G01C 21/26* (2013.01)

(56) References Cited

U.S. PATENT DOCUMENTS

| | | | | |
|---|---|---|---|---|
| 5,872,433 | A * | 2/1999 | Sakai | H02J 1/10 318/106 |
| 6,803,946 | B1 * | 10/2004 | Wakiyama | H04N 5/232 348/143 |
| 9,654,738 | B1 * | 5/2017 | Ferguson | H04N 7/18 |
| 2002/0012052 | A1 * | 1/2002 | Nagano | H04N 5/2254 348/228.1 |
| 2003/0108337 | A1 * | 6/2003 | Tsuchida | H04N 5/772 386/224 |
| 2005/0140787 | A1 * | 6/2005 | Kaplinsky | G08B 13/19656 348/207.1 |
| 2005/0285945 | A1 * | 12/2005 | Usui | H04N 5/232 348/207.99 |
| 2006/0125919 | A1 * | 6/2006 | Camilleri | B60R 1/00 348/148 |
| 2009/0251567 | A1 * | 10/2009 | Guichard | H04N 5/23245 348/234 |
| 2010/0208098 | A1 * | 8/2010 | Ogawa | H04N 5/23245 348/223.1 |
| 2011/0007186 | A1 | 1/2011 | Yonaha | |
| 2011/0050950 | A1 | 3/2011 | Nomura | |
| 2012/0262600 | A1 | 10/2012 | Velarde et al. | |
| 2014/0200759 | A1 * | 7/2014 | Lu | B60D 1/245 701/28 |

FOREIGN PATENT DOCUMENTS

| | | |
|---|---|---|
| JP | 2012-32992 | 2/2012 |
| JP | 2012-49600 | 3/2012 |
| JP | 2013-192057 | 9/2013 |

OTHER PUBLICATIONS

Quoc Kien Vuong et al., A New Auto Exposure and Auto White-Balance Algorithm to Detect High Dynamic Range Conditions Using CMOS Technology, Proceedings of the World Congress on Engineering and Computer Science 2008, Oct. 22-24, 2008, San Francisco, USA.

Extended European Search Report dated Apr. 23, 2018 in European Application No. 15859559.5.

* cited by examiner

VEHICLE-MOUNTED CAMERA SYSTEM

TECHNICAL FIELD

This invention relates to a vehicle-mounted camera system.

BACKGROUND ART

A technique of obtaining a wide dynamic range image (high dynamic range image) by controlling an exposure time by frame or pixel has been known. With this technique, long exposure time shooting having a relatively long exposure time and short exposure time shooting having a relatively short exposure time are performed, and a long exposure time image obtained by the long exposure time shooting and a short exposure time image obtained by the short exposure time shooting are composed to generate a high dynamic range image. A technique of executing an appropriate white balance correction processing to the long exposure time image and the short exposure time image before the long exposure time image and the short exposure time image are composed (see, for example, Patent Literature 1) has been also proposed.

CITATION LIST

Patent Literature

Patent Literature 1: JP2003-189315A

SUMMARY

Technical Problem

A vehicle-mounted camera system that is provided in a vehicle and shoots a circumference of the vehicle has been widespread. It is important for the vehicle-mounted camera system to obtain a high dynamic range image. The vehicle-mounted camera system obtains the long exposure time image and the short exposure time image. However, the usage environment of the vehicle-mounted camera system has a feature in which a variously changing illumination environments in shooting of an image changes.

The illumination environment includes an outside in the daytime with sunlight as a light source, an outside in the nighttime without sunlight, and a location illuminated by a single light source without receiving sunlight. The outside in the daytime is strongly affected by sunlight. The outside in the nighttime has no sunlight, but has a light-emitting light source such as a signal lamp, a street lamp, and a decoration lamp in addition to reflection light illuminated by a headlight. The location illuminated by the single light source includes an inside of a tunnel illuminated by a sodium lamp and an indoor parking illuminated by a fluorescent lamp.

A technique of giving effective information to a driver or a vehicle based on an image obtained by a vehicle-mounted camera system has been also developed. Such a technique includes, based on an image shot by the vehicle-mounted camera system, a function of detecting a white line separating a traffic lane, a sign, another vehicle, and a pedestrian, a function as a drive recorder that records an image, and a head-up display function of projecting an image onto a windshield. In order to operate these functions based on the image with high accuracy, it is necessary to appropriately execute a white balance correction processing to a shot image.

The present invention has been made in view of the above circumstances, and an object of the present invention is to provide a vehicle-mounted camera system that executes, to the obtained two or more types of exposure images, an appropriate white balance correction processing according to an illumination environment even in variously changing illumination environments.

Solution To Problem

The present invention provides a vehicle-mounted camera system including a vehicle-mounted camera that is provided in a vehicle, and shoots in at least two different exposure times, a signal processing device that is configured to execute a white balance correction processing to two or more types of exposure images shot in the at least two different exposure times and generate a high dynamic range image based on the two or more types of the exposure images to which the white balance correction processing is executed, and a processing switch device that is configured to obtain an illumination environment in which the vehicle is placed and switch the white balance correction processing for the two or more types of the exposure images by the signal processing device according to the obtained illumination environment.

Advantageous Effects

According to the vehicle-mounted camera system of the present invention, an appropriate white balance correction processing according to an illumination environment can be executed to the obtained two or more types of exposure images even in variously changing illumination environments.

DESCRIPTION OF EMBODIMENT

Hereinafter, a specific embodiment of a vehicle-mounted camera system according to the present invention will be described with reference to the drawings.

<Configuration of Vehicle-Mounted Camera System>

Figure 1:
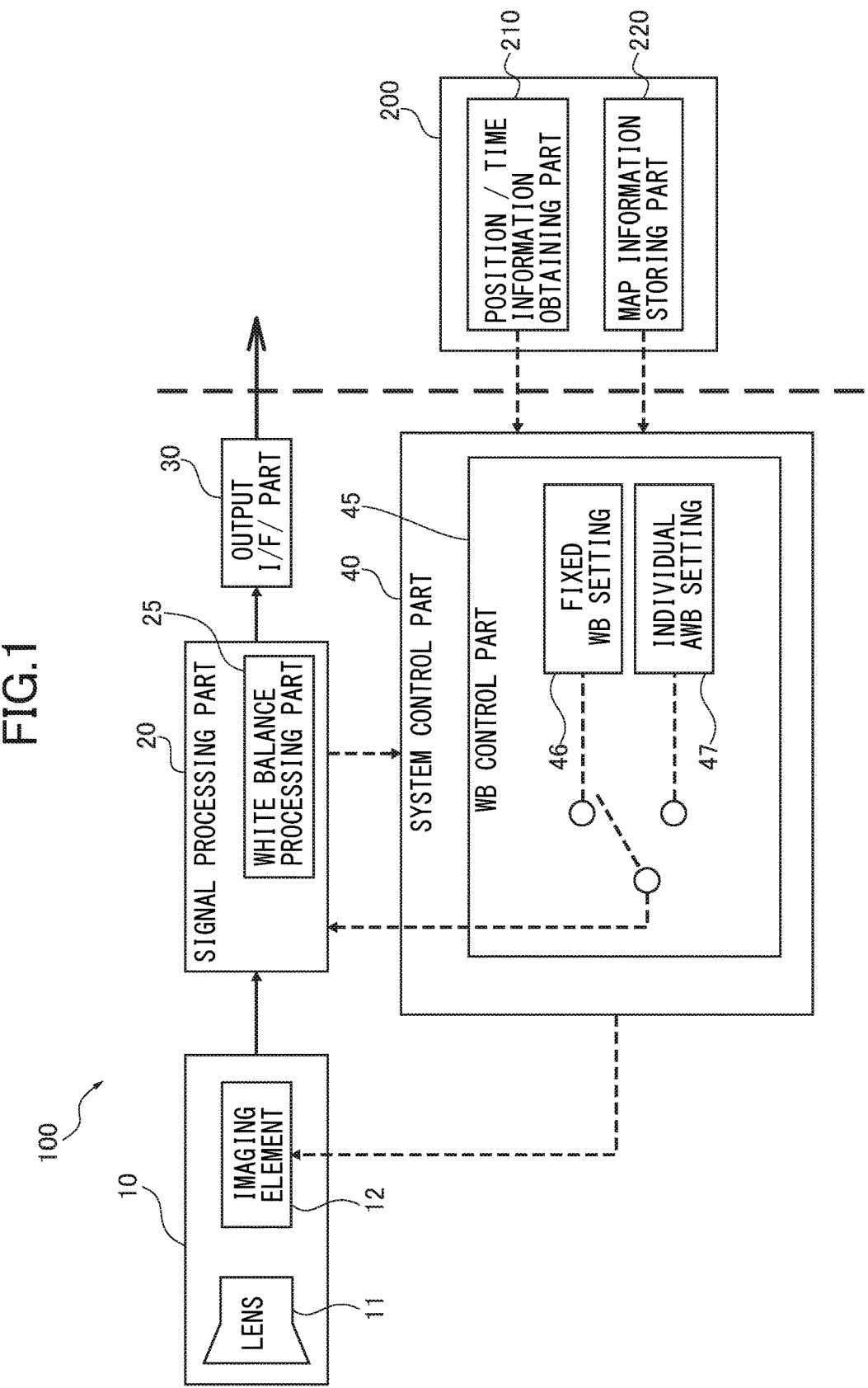
FIG. 1 is a block diagram illustrating a configuration of a vehicle-mounted camera system according to one embodiment of the present invention.

FIG. 1 is a block diagram illustrating a configuration of a vehicle-mounted camera system 100 according to one embodiment of the present invention. A solid line in FIG. 1 shows flow of an image signal (picture signal) and a dashed line shows flow of a control signal. The vehicle-mounted camera system 100 illustrated in the figure is provided in a not-shown vehicle and includes a vehicle-mounted camera 10, a signal processing part 20 (one example of a signal processing device), a system control part 40 (one example of a processing switch device), and an output interface (I/F) part 30.

The vehicle-mounted camera 10 uses a range including a road surface in front of a vehicle as a subject. The vehicle-mounted camera 10 includes a color imaging element 12 and a lens 11 that forms an image of a subject onto the imaging element 12. The imaging element 12 is controlled by the after-described system control part 40 to execute short exposure time shooting having a relatively short exposure time and long exposure time shooting having a relatively long exposure time. The imaging element 12 therefore alternatively outputs a short exposure time image by the short exposure time shooting and a long exposure time image by the long exposure time shooting. The exposure time of the short exposure time shooting is, for example, $\frac{1}{3000}$ (second) and the exposure time of the long exposure time shooting is, for example, $\frac{1}{30}$ (second). However, the exposure times are not limited to these times.

The signal processing part 20 executes various signal processings to the long exposure time image and the short exposure time image output from the imaging element 12. The signal processing part 20 includes a white balance processing part 25. The white balance processing part 25 executes a white balance correction processing to the long exposure time image and the short exposure time image based on a parameter. The parameter of the white balance correction processing is set by the after-described white balance (WB) control part 45 of the system control part 40. The white balance processing part 25 therefore executes the white balance correction processing based on the parameter set by the white balance control part 45.

The signal processing part 20 generates a high dynamic range image having a dynamic range wider than that of the short exposure time image and the long exposure time image based on the short exposure time image to which the white balance correction processing is executed and the long exposure time image to which the white balance correction processing is executed. Various methods may be applied to the processing of generating a high dynamic range image.

The system control part 40 receives positional information on a position in which a vehicle is placed and time information on a present time from a position/time information obtaining part 210 in a navigation system 200 provided in the vehicle. The navigation system 200 is an external configuration of the vehicle-mounted camera system 100. The navigation system 200 includes a map information storing part 220 that stores map information. The system control part 40 also receives the map information output from the map information storing part 220.

The system control part 40 specifies the location of the vehicle based on the received positional information and map information. The system control part 40 obtains an illumination environment at the location in which the vehicle is placed based on the location information on the specified location and the received time information. The location specified by the system control part 40 includes an outside (for example, a load and a parking lot except a tunnel) and a tunnel.

The system control part 40 determines (specifies) a day-night classification at the present time in that location based on the positional information and the time information. The day-night classification is made as a database corresponding to the location and the time. The system control part 40 includes such a database. In this case, an environment with the sun, namely, a daytime is classified as a day and an environment without the sun, namely, a nighttime except a daytime is classified as a night. The system control part 40 obtains any one of (1) an illumination environment of an outside in the daytime, (2) an illumination environment of an outside in the nighttime, and (3) an illumination environment of a single light source based on the above-described location information and time information, namely, the day-night classification.

In this case, (1) the illumination environment of the outside in the daytime is an illumination environment in the outside classified as the day, which is an illumination environment with sunlight as a light source, (2) the illumination environment of the outside in the nighttime is an illumination environment in the outside classified as the night, which is an illumination environment without sunlight and with a light source such as a light-emitting light source, for example, a signal lamp, a street lamp, and a decoration lamp and reflection light of a subject mainly illuminated by a headlight, and (3) the illumination environment of the single light source is an illumination environment in the tunnel illuminated by a single light source (mostly having a single wavelength) such as a sodium lamp regardless of a day and night.

The system control part 40 includes a white balance control part 45 that switches a white balance correction processing for the long exposure time image and the short exposure time image by setting a parameter for the white balance correction processing executed by the white balance processing part 25 according to the obtained illumination environment. The parameter for the white balance correction processing is obtained by known various methods. The white balance control part 45 sets a parameter corresponding to any one of the following (A), (B), and (C) white balance correction processings.

(A) The white balance correction processing for the short exposure time image and the white balance correction processing for the long exposure time image are set to an automatic white balance (AWB) correction processing.

(B) The white balance correction processing for the short exposure time image is set to a fixed white balance correction processing having a previously set parameter and the white balance correction processing for the long exposure time image is set to the automatic white balance correction processing.

(C) The white balance correction processing for the short exposure time image and the white balance correction processing for the long exposure time image are set to the fixed white balance correction processing having the previously set parameter.

When the location information and the day-night classification are specified to the above (1), the white balance control part 45 switches the white balance correction processing to the above (A) white balance correction processing (an individual AWB setting 47 to each of the long exposure time image and the short exposure time image). When the location information and the day-night classification are specified to the above (2), the white balance control part 45 switches the white balance correction processing to the above (B) white balance correction processing (the individual AWB setting 47 to the long exposure time image and the fixed WB setting 46 to the short exposure time image). When the location information and the day-night classification are specified to the above (3), the white balance control part 45 switches the white balance correction processing to the above (C) white balance correction processing (the fixed WB setting 46 to each of the long exposure time image and the short exposure time image).

The system control part 40 outputs, to the signal processing part 20, the parameter corresponding to the set white balance correction processing. The white balance processing part 25 of the signal processing part 20 executes the white balance correction processing based on the parameter input from the system control part 40 to each of the long time exposure image and the short time exposure image.

The output interface part 30 outputs a high dynamic range image output from the signal processing part 20 to an external device, for example, a device having a function of detecting a white line separating a traffic lane, a sign, another vehicle, and a pedestrian based on the image shot by the vehicle-mounted camera system 100, to a drive recorder that records an image, and to a head-up display that projects an image onto a windshield.

<Function of Vehicle-Mounted Camera System>

Figure 2:
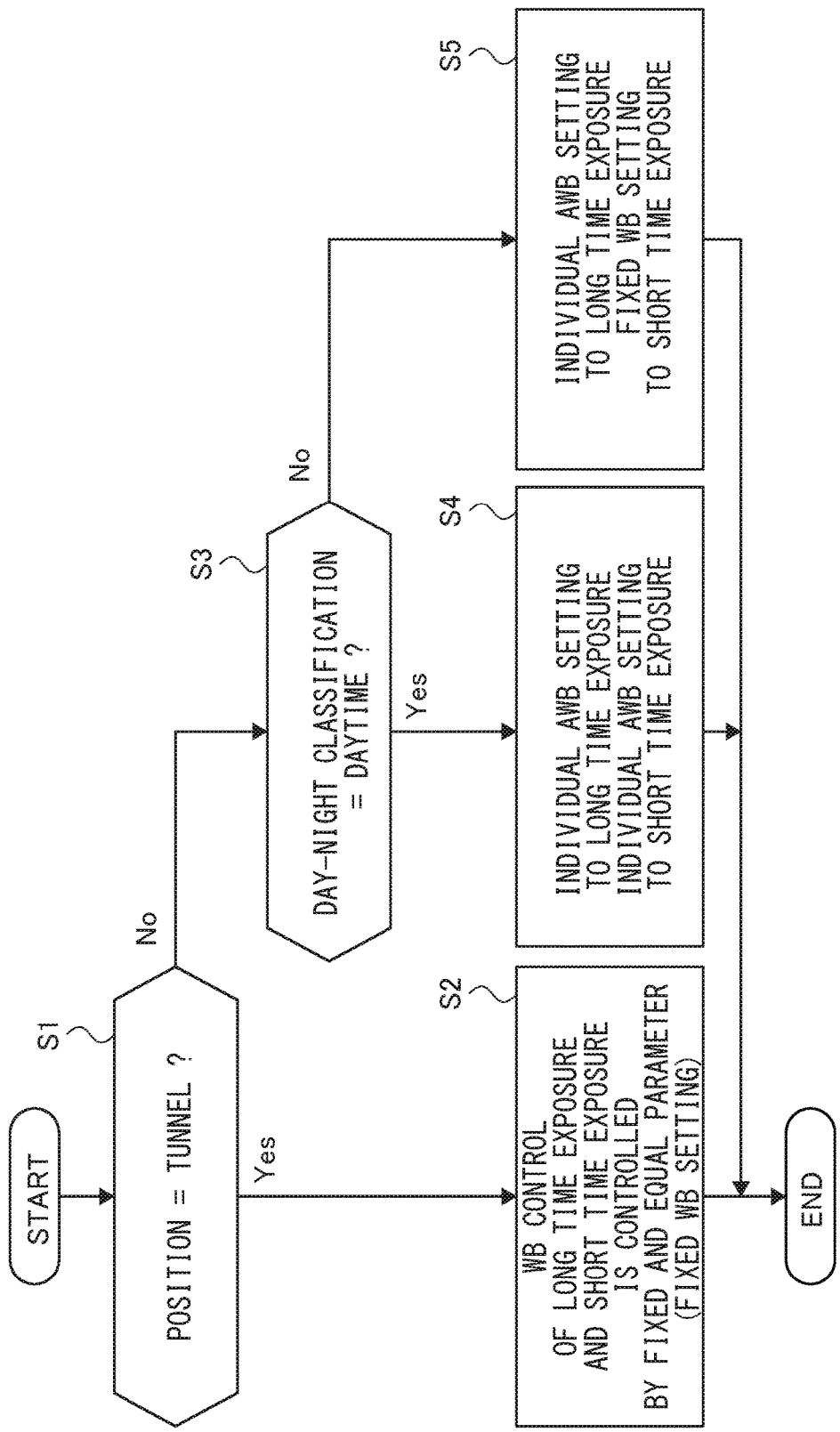
FIG. 2 is a flowchart illustrating a function (processing) of the vehicle-mounted camera system according to the embodiment illustrated in FIG. 1.

FIG. 2 is a flowchart showing the function (processing) of the system control part 40 of the vehicle-mounted camera system 100 according to the embodiment illustrated in FIG. 1. The processing of the vehicle-mounted camera system 100 will be hereinafter described.

The vehicle-mounted camera 10 alternatively and continuously performs the above-described short exposure time shooting and long exposure time shooting under the control of the system control part 40. The vehicle-mounted camera 10 outputs the short exposure time image and long exposure time image to the signal processing part 20. The system control part 40 obtains the map information as well as the positional information and time information of the vehicle corresponding to the timing shot by the vehicle-mounted camera 10 from the navigation system 200.

The signal processing part 20 calculates a ratio of a red (R) component signal, a green (G) component signal, and a blue (B) component signal from the image signal of each exposure image (short exposure time image and long exposure time image), and outputs the obtained ratio of RGB to the system control part 40. The ratio of RGB is used to set the parameter of the white balance correction processing.

The system control part 40 specifies the location information as well as the day-night classification based on the map information as well as the positional information and time information obtained corresponding to a timing in which the short exposure time image and the long exposure time image to which the ratio of RGB is input are shot by the vehicle-mounted camera 10. As illustrated in FIG. 2, the system control part 40 determines whether or not the location is inside a tunnel based on the specified location information (S1). When the location is inside the tunnel (Yes in S1), the system control part 40 outputs, relative to each of the short exposure time image and the long exposure time image, the parameter corresponding to the white balance correction processing (fixed WB setting 46 in FIG. 1) to the signal processing part 20 (S2). The white balance processing part 25 of the signal processing part 20 thereby executes the white balance correction processing corresponding to the fixed WB setting 46 to each of the short exposure time image and the long exposure time image.

The inside of the tunnel has the illumination environment illuminated by a single light source such as a sodium lamp that emits light of a single wavelength. Even when the white balance correction processing is executed by any parameter, the RGB component cannot be corrected to 1:1:1.

It is assumed that the short exposure time image and the long exposure time image obtained in the tunnel are images shot under the illumination environment (for example, 5000 kelvin at a color temperature) with the sunlight as the light source. The parameter for the white balance correction processing to be generally executed to the image shot in the illumination environment with the sunlight as the light source is experimentally obtained in advance, and the fixed WB setting 46 of the system control part 40 stores such a parameter.

When the white balance correction processing (fixed WB setting 46) is executed to the short exposure time image and the long exposure time image obtained in the tunnel by the stored parameter, an image in a color close to a color seen by naked eyes of a driver can be obtained. Unpredictable results can be thereby prevented even when an automatic white balance correction processing of forcibly correcting the RGB component to 1:1:1 is executed.

More specifically, an appropriate white balance correction processing is executed to the image obtained in the tunnel. In the image obtained in the tunnel, the white line separating the traffic lane, for example, is output to an external device through the output interface part 30 as an orange line by the illumination of the sodium lamp. In this case, a processing of converting the image into a gray scale image by eliminating a color phase by an external device is executed.

The short exposure time image and the long exposure time image to which the above-described white balance correction processing is executed are composed by the signal processing part 20 to be a high dynamic range image. The high dynamic range image is output to an external device through the output interface part 30.

In the determination of S1, when the location is not inside the tunnel (No in S1), the system control part 40 determines the day-night classification (S3). When the day-night classification is determined as the daytime (Yes in S3), the system control part 40 outputs, to the signal processing part 20, the parameter corresponding to (A) the white balance correction processing (individual AWB setting 47 in FIG. 1), relative to each of the short exposure time image and the long exposure time image (S4). The white balance processing part 25 of the signal processing part 20 executes the white balance correction processing corresponding to the individual AWB setting 47 to each of the short exposure time image and long exposure time image.

The short exposure time image and the long exposure time image obtained in the outside in the daytime (except the inside of the tunnel) are images obtained under the illumination environment with the sunlight as the light source. Even under the illumination environment with the sunlight as the light source, the illumination environment under the sun differs from the illumination environment in the shadow in a color temperature. When the automatic white balance correction processing corresponding to the illumination environment under the sun is executed to the short exposure time image and the automatic white balance correction processing corresponding to the illumination environment in the shadow is executed to the long exposure time image, a preferable white balance of the high dynamic range image after the composition of the these images is obtained.

The system control part 40 of the present embodiment outputs the parameter corresponding to the individual AWB setting 47 to the signal processing part 20 (S4), and the white balance processing part 25 executes the white balance correction processing corresponding to the individual AWB setting 47 to each of the short exposure time image and the long exposure time image, so that the high dynamic range image in a color close to a color seen by naked eyes of a driver can be obtained.

The short exposure time image and the long exposure time image to which the above-described white balance correction processing is executed are composed by the signal processing part 20 to be the high dynamic range image. The high dynamic range image is output to an external device through the output interface part 30.

In the determination of S3, when the day-night classification is not the daytime (No in S3), the system control part 40 outputs the parameter corresponding to (B) the white balance correction processing (the fixed WB setting 46 to the short exposure time image and the individual AWB setting 47 to the long exposure time image in FIG. 1) to the signal processing part 20 (S5). The white balance processing part 25 of the signal processing part 20 thereby executes the white balance correction processing corresponding to the fixed WB setting 46 to the short exposure time image and the white balance correction processing corresponding to the individual AWB setting 47 to the long exposure time image.

In this case, the short exposure time image obtained in the outside in the nighttime (except the inside of the tunnel) is an image on which a light-emitting light source such as a signal lamp, a street lamp, and a decoration lamp is projected. However, when the automatic white balance correction processing is executed to the short exposure time image on which a mainly green lighting signal lamp is projected, the green color may be converted into a white color. Similar conversion happens to an image on which a red or yellow lighting signal lamp is projected. In this embodiment, the system control part 40 executes the white balance correction processing of the fixed WB setting 46 to the short exposure time image, so that the light emitting color of such a signal lamp is prevented from being converted into a color different from appearance.

On the other hand, the long exposure time image obtained in the outside in the nighttime (except the inside of the tunnel) is an image representing the reflection light of the subject such as a white line mainly illuminated by a headlight. The detected white line may be used for a function of maintaining the vehicle in a current traffic lane, for example, by the above-described external device. The system control part 40 in this embodiment improves the detection accuracy of the white line, for example, by executing the automatic white balance correction processing for the long exposure time image.

The short exposure time image and the long exposure time image to which the above white balance correction processing is executed are composed by the signal processing part 20 to be the high dynamic range image. The high dynamic range image is output to an external device through the output interface part 30.

As described above, according to the vehicle-mounted camera system 100 of the present embodiment, an appropriate white balance correction processing selected from a plurality of white balance correction processings according to the situation of the illumination environment is executed to the long exposure time image and the short exposure time image obtained in variously changing illumination environments.

The vehicle-mounted camera system 100 of this embodiment shows the example of the illumination environment in the tunnel illuminated by the single light source (mainly single wavelength) such as a sodium lamp as (3) the illumination environment of the single light source. However, the illumination environment of the single light source may include an indoor parking (including underground parking) regardless of the daytime and the nighttime.

The vehicle-mounted camera system 100 of the present embodiment generates the high dynamic range image based on the two types of exposure images such as the long exposure time image and the short exposure time image. In this case, the high dynamic range image is an image having an improved gradation in a low illuminance range based on the long exposure time image and an improved gradation in a high illuminance range based on the short exposure time image.

However, the vehicle-mounted camera system according to the present invention may generate the high dynamic range image based on three or more types of the exposure images each having a different exposure time. In this case, the high dynamic range image is an image having an improved gradation in a low illuminance range based on the long exposure time image, an improved gradation in a high illuminance range based on the short exposure time image, and an improved gradation in an intermediate illuminance range based on an intermediate exposure time image (the image exposed by an exposure time shorter than that of the long exposure time image and an exposure time longer than that of the short exposure time image).

When the high dynamic range image is generated by the three or more types of exposure images as described above, the white balance correction processing is executed to each of the exposure images as follows. Namely, the white balance correction processing similar to that of the long exposure time image in the present embodiment is executed to two or more types of relatively long exposure time images including a specific exposure time image in the three or more types of the exposure images, and the white balance correction processing similar to that of the short exposure time image in the present embodiment is executed to one or more types of relatively short exposure time image without including the specific exposure time image in the three or more types of exposure images. Alternatively, the white balance correction processing similar to that of the long exposure time image in the present embodiment is executed to one or more types of relatively long exposure time image without including a specific exposure time image in the three or more types of exposure images and the white balance correction processing similar to that of the short exposure time image in the present embodiment is executed to two or more types of relatively short exposure time images including a specific exposure time image in the three or more types of exposure images. A correction process different from that of the long exposure time image and that of the short exposure time image in the present embodiment may be executed to the specific exposure time image in the three or more types of exposure images.

The above-described white balance correction processings (A), (B), and (C) corresponding to the parameter set by the white balance control part 45 are executed as follows as an example.

(A) The white balance correction processing for the short exposure time image, the white balance correction processing for the long exposure time image, and the white balance correction processing for another exposure image except the short exposure time image and the long exposure time image are set to the automatic white balance correction processing.

(B) The white balance correction processing for the short exposure time image is set to the fixed white balance correction processing having a previously set parameter, the white balance correction processing for the long exposure time image is set to the automatic white balance (AWB) correction processing, and the white balance correction processing for another exposure image except the short exposure time image and the long exposure time image is set to the fixed white balance correction processing having a previously set parameter or the automatic white balance (AWB) correction processing.

(C) The white balance correction processing for the short exposure time image, the white balance correction processing for the long exposure time image, and the white balance correction processing for another exposure image except the short exposure time image and the long exposure time image are set to the fixed white balance correction processing having a previously set parameter.

CROSS-REFERENCE TO RELATED APPLICATION

The present application is based on and claims priority from Japanese Patent Application No. 2014-230608, filed on Nov. 13, 2014, the disclosure of which is hereby incorporated by reference in its entirety.

The invention claimed is:

1. A vehicle-mounted camera system, comprising:
a vehicle-mounted camera that is provided in a vehicle and shoots in at least two different exposure times; and
a non-transitory computer-readable recording medium storing a program, which when executed by a processor causes the vehicle-mounted camera system to operates as:
a signal processing device that is configured to execute a white balance correction processing to two or more types of exposure images shot in the at least two different exposure times and generate a high dynamic range image based on the two or more types of the exposure images to which the white balance correction processing is executed; and
a processing switch device that is configured to obtain an illumination environment in which the vehicle is placed and switch the white balance correction processing for the two or more types of the exposure images by the signal processing device according to the obtained illumination environment,
wherein the signal processing device includes, as the white balance correction processing,
(A) a white balance correction processing for a relatively short exposure time image of the two or more types of the exposure images and a white balance correction processing for a relatively long exposure time image of the two or more types of the exposure images being set to an automatic white balance correction processing;
(B) the white balance correction processing for the relatively short exposure time image of the two or more types of the exposure images being set to a fixed white balance correction processing having a previously set parameter, and the white balance correction processing for the relatively long exposure time image of the two or more types of the exposure images being set to the automatic white balance correction processing; and
(C) the white balance correction processing for the relatively short exposure time image of the two or more types of the exposure images and the white balance correction processing for the relatively long exposure time images of the two or more types of the exposure images being set to the fixed white balance correction processing having the predetermined set parameter, and
the processing switch device is configured to specify any one of (1) an illumination environment of an outside in a daytime, (2) an illumination environment of an outside in a nighttime, and (3) an illumination environment of a single light source, and switch the white balance correction processing to (A) the white balance correction processing when (1) is specified, the white balance correction processing to (B) the white balance correction processing when (2) is specified, and the white balance correction processing to (C) the white balance correction processing when (3) is specified.

2. The vehicle-mounted camera system according to claim 1, wherein when the two or more types of the exposure images are three or more types of the exposure images each having a different exposure time, as a white balance correction processing for another exposure image except the short exposure time image and the long exposure time image, the automatic white balance correction processing is set to (A) the white balance correction processing, the fixed white balance correction processing having the previously set parameter or the automatic white balance (AWB) correction processing is set to (B) the white balance correction processing, and the fixed white balance correction processing having the previously set parameter is set to (C) the white balance correction processing.

3. The vehicle-mounted camera system according to claim 1, wherein the processing switch device is configured to obtain the illumination environment based on location information and time information on which the vehicle is placed.

4. The vehicle-mounted camera system according to claim 3, wherein the processing switch device is configured to obtain the location information based on positional information and map information output from a navigation system in the vehicle.

* * * * *